United States Patent
Barde et al.

(10) Patent No.: US 10,608,245 B2
(45) Date of Patent: Mar. 31, 2020

(54) MOLYBDENUM-BASED ELECTRODE MATERIALS FOR RECHARGEABLE CALCIUM BATTERIES

(71) Applicants: TOYOTA MOTOR EUROPE, Brussels (BE); AGENCIA ESTATAL CONSEJO SUPERIOR DE INVESTIGACIONES CIENTIFICAS, Madrid (ES)

(72) Inventors: Fanny Barde, Holsbeek (BE); Maria Rosa Palacin, Barcelona (ES); Alexandre Ponrouch, Barcelona (ES); Maria Elena Arroyo de Dompablo, Mostoles (ES)

(73) Assignees: TOYOTA MOTOR EUROPE, Brussels (BE); AGENCIA ESTATAL CONSEJO SUPERIOR DE INVESTIGACIONES CIENTIFICAS, Madeid (ES)

( * ) Notice: Subject to any disclaimer, the term of this patent is extended or adjusted under 35 U.S.C. 154(b) by 0 days.

(21) Appl. No.: 15/777,842

(22) PCT Filed: Apr. 5, 2016

(86) PCT No.: PCT/EP2016/057426
§ 371 (c)(1),
(2) Date: May 21, 2018

(87) PCT Pub. No.: WO2017/097437
PCT Pub. Date: Jun. 15, 2017

(65) Prior Publication Data
US 2018/0351165 A1     Dec. 6, 2018

(30) Foreign Application Priority Data
Dec. 10, 2015   (ES) .................................. 201500889

(51) Int. Cl.
*H01M 10/054* (2010.01)
*H01M 4/36* (2006.01)
(Continued)

(52) U.S. Cl.
CPC ........... *H01M 4/364* (2013.01); *H01M 4/381* (2013.01); *H01M 4/386* (2013.01); *H01M 4/387* (2013.01);
(Continued)

(58) Field of Classification Search
None
See application file for complete search history.

(56) References Cited

U.S. PATENT DOCUMENTS

2003/0059684 A1   3/2003  Takami et al.
2013/0260225 A1*  10/2013  Doe .................... H01M 4/381
                                                        429/188

FOREIGN PATENT DOCUMENTS

| JP | 2002-270244 A | 9/2002 |
| JP | 2012-248470 A | 12/2012 |
| WO | 2013/139370 A1 | 9/2013 |

OTHER PUBLICATIONS

Aug. 25, 2016 International Search Report issued in International Patent Application No. PCT/EP2016/057426.
(Continued)

*Primary Examiner* — Wojciech Haske
(74) *Attorney, Agent, or Firm* — Oliff PLC

(57) ABSTRACT

A calcium-based secondary cell including, as a positive-electrode active material, a molybdenum oxide-based material containing molybdenum in an oxidation state of 4 or more and 6 or less.

8 Claims, 10 Drawing Sheets

(51) Int. Cl.
  H01M 4/38      (2006.01)
  H01M 4/485     (2010.01)
  H01M 10/0569   (2010.01)
  H01M 10/0568   (2010.01)
  H01M 4/583     (2010.01)
  H01M 4/02      (2006.01)

(52) U.S. Cl.
  CPC .......... H01M 4/485 (2013.01); H01M 4/583 (2013.01); H01M 10/054 (2013.01); H01M 10/0568 (2013.01); H01M 10/0569 (2013.01); H01M 2004/027 (2013.01); H01M 2004/028 (2013.01)

(56) References Cited

OTHER PUBLICATIONS

Aug. 25, 2016 Written Opinion issued in International Patent Application No. PCT/EP2016/057426.
Lipson et al, "Rechargeable Ca-Ion Batteries: A New Energy Storage System," Chemistry of Materials, vol. 27, No. 24, Nov. 24, 2015, pp. 8442-8447.
Sammells et al, "Secondary Calcium Solid Electrolyte High Temperature Battery," Journal of the Electrochemical Society, vol. 133, No. 1, Jan. 1, 1986, pp. 235-236.
Rogosic et al. "Towards the Development of Calcium Ion Batteries," Department of Materials Science and Engineering of Massachusetts Institute of Technology, Jun. 10, 2014. With Abstract #664, The Electrochemical Society, 2012.
Hayashi et al. "Electrochemical Insertion/Extraction of Calcium Ions Using Crystalline Vanadium Oxide", Electrochemical and Solid-State Letters, vol. 7, No. 5, 2004, pp. A119-121.
Hayashi et al, "Electrochemical Characteristics of Calcium in Organic Electrolyte Solutions and Vanadium Oxides as Calcium Hosts," Journal of Power Sources, 2003, pp. 617-620.
De La Calle et al, "Neutron Diffraction Study and Magnetotransport Properties of Stoichiometric CaMoO3 Perovskite Prepared by a Soft-Chemistry Route," Journal of Solid State Chemistry, 2006, pp. 1636-1641.
Persaran et al, "Cooling and Preheating of Batteries in Hybrid Electric Vehicles," The 6th ASME-JSME Thermal Engineering Joint Conference, Mar. 16-20, 2003, TED-AJ03-633.
Im et al, "Chemical Stability and Electrochemical Properties of CaMoO3-[delta] for SOFC Anode," Ceramics International, vol. 38, 2012, pp. 153-158.

* cited by examiner

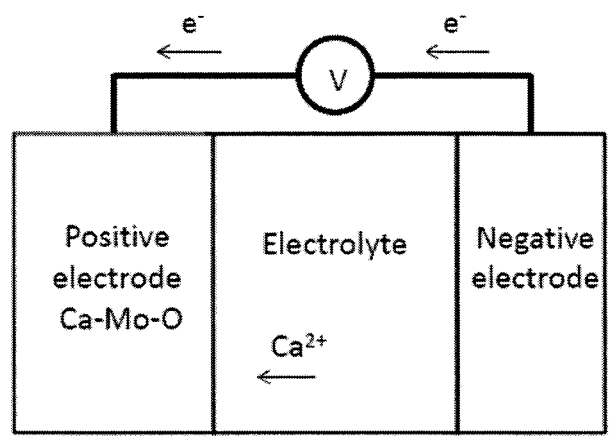
Fig. 1a
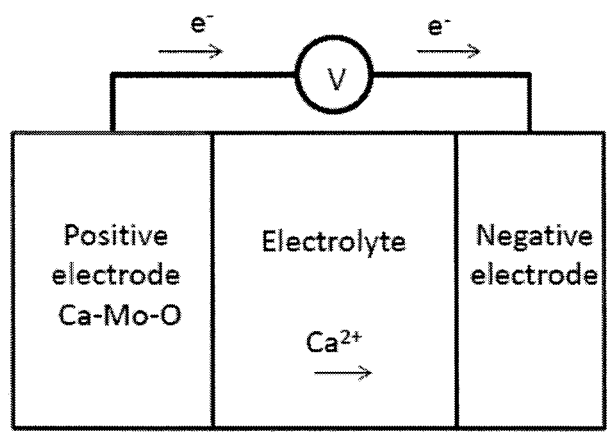
Fig. 1b
Figure 1

MOLYBDENUM-BASED ELECTRODE MATERIALS FOR RECHARGEABLE CALCIUM BATTERIES

FIELD OF INVENTION

The present invention relates to a calcium-based secondary cell comprising, as a positive-electrode active material, a molybdenum oxide-based material containing molybdenum in an oxidation state of 4 or more and 6 or less.

TECHNOLOGICAL BACKGROUND

Secondary (i.e. rechargeable) electrochemical cells and batteries are a power source widely used in Information-related devices, communication devices (such as personal computers, camcorders and cellular phones) as well as in the automobile industry or in stationary power generating devices. Conventional lithium-based cells typically Include a positive electrode (also referred to as "cathode") and a negative electrode (also referred to as "anode") whose active materials are capable of accepting and releasing lithium ions, as well as an electrolyte arranged between the electrodes and including lithium ions.

Calcium is much more abundant in nature than lithium and, despite the high atomic weight of Ca with respect to Li, the bivalent nature of Ca means that it could in principle provide a suitable rechargeable battery material, even if it has proven difficult so far to identify suitable chemistries and Ca batteries are very underdeveloped as compared to their Li counterparts.

Issues to be addressed in developing rechargeable Ca-based batteries Include:
- the capacities of some known rechargeable Ca-based batteries are relatively low;
- if heated above 40° C., the electrolyte used may be subjected to decomposition in the presence of certain transition metal oxide materials typically used as positive electrode materials such as Co-based materials for example;
- the operation voltages of some known rechargeable Ca-based batteries are relatively low;
- reducing volume variations during cycling.

In JP 2012-248470, $Ca_3Co_2O_6$ is proposed as a positive electrode material for Ca-based batteries using $V_2O_5$ as negative electrode. The operation voltage of this battery is however relatively low.

In the Ph.D. thesis of John Rogosic entitled "Towards the Development of Calcium Ion Batteries" (MIT, 2014), $V_2O_5$, $FeS_2$ and $Mo_3Se_4$ Chevrel phases are reported as possible positive electrode materials. The Chevrel phase is reported as the most promising material. In such a case the initial de-intercalated material has a molar mass of 600.84 g/mol. Tests are performed in a cell with the following configuration: $CaHg_{11}$—CaHg/acetonitrile+$Ca(ClO_4)_2$/positive materials. The capacities (mAh/g-active positive material) achieved in this prior art are extremely low because the positive and negative materials reported have high molar weight. Also non-environmentally friendly mercury is contained. In addition, acetonitrile is highly flammable.

In Hayashi et al., *Electrochemical and Solid-state Letters*, 7(5), A119-A121 (2004), $V_2O_5$ is reported as possible host materials for $Ca^{2+}$ ions. The accommodation of $Ca^{2+}$ in the $V_2O_5$ structure takes place around −1 V vs. $Ag^+$/Ag pseudo reference (believed to be equivalent to 2.67 V vs $Ca^{2+}$/Ca). Re-chargeability is not demonstrated in this document.

In Hayashi et al., *Journal of Power Sources* 119-121 (2003), 617-620, $V_2O_5$ or $V_2O_5$—$P_2O_5$ are reported as possible host materials for $Ca^{2+}$ ions. The accommodation of $Ca^{2+}$ in the $V_2O_5$ structure takes place around −1 V vs. $Ag^+$/Ag pseudo reference (believed to be equivalent to 2.67 V vs $Ca^{2+}$/Ca). The cell configuration is Ca/electrolyte+$Ca(ClO_4)_2$/$V_2O_5$. Re-chargeability for 1 cycle is apparently observed in this system and a new phase was formed during discharge.

In US 2003/0059684, a non-aqueous electrolyte battery is disclosed whose negative electrode contains Al, Ca or Mg, and wherein the electrolytic solution uses a mixture of organic solvents, such as a lactone, acetonitrile or carbonate, and an alkyl sulfone. $Fe_2(SO_4)_3$ is the main positive electrode material described in the examples, but the molar mass of $Fe_2(SO_4)_3$ is already very high—even without considering the $Ca^{2+}$ ions mass contribution. Theoretical capacities are not described nor the expected maximum amount of $Ca^{2+}$ expected to be accommodated in the structure. The operation voltage of the various types of batteries is said to be between 1V for discharge and 3V for charge for all types of batteries containing Al, Ca or Mg.

In de la Calle et at, *Journal of Solid State Chemistry* 179, (2006), 1636-1641, $CaMoO_3$ synthesis by a soft chemical route is reported. It is not used as a battery material but as a magnetic material.

SUMMARY OF THE INVENTION

The present invention, in one aspect, relates to a calcium-based secondary cell comprising:
- a negative electrode that includes a negative-electrode active material, said negative-electrode active material being capable of accepting and releasing calcium ions,
- a positive electrode that includes a positive-electrode active material, said positive-electrode active material being capable of accepting and releasing calcium ions,
- an electrolyte arranged between the negative electrode and the positive electrode,
- wherein the positive-electrode active material is a molybdenum oxide-based material containing molybdenum in an oxidation state of 4 or more and 6 or less.

The invention further relates to a non-aqueous calcium-based secondary battery comprising such a calcium-based secondary cell, and further to a vehicle, an electronic device or a stationary power generating device comprising such a non-aqueous calcium-based secondary battery.

BRIEF DESCRIPTION OF THE FIGURES

FIG. 1 is a schematic view of a calcium-based secondary cell of the present invention, during the discharge (a) and charge (b) processes.

DETAILED DISCLOSURE OF THE INVENTION

Figure 2:
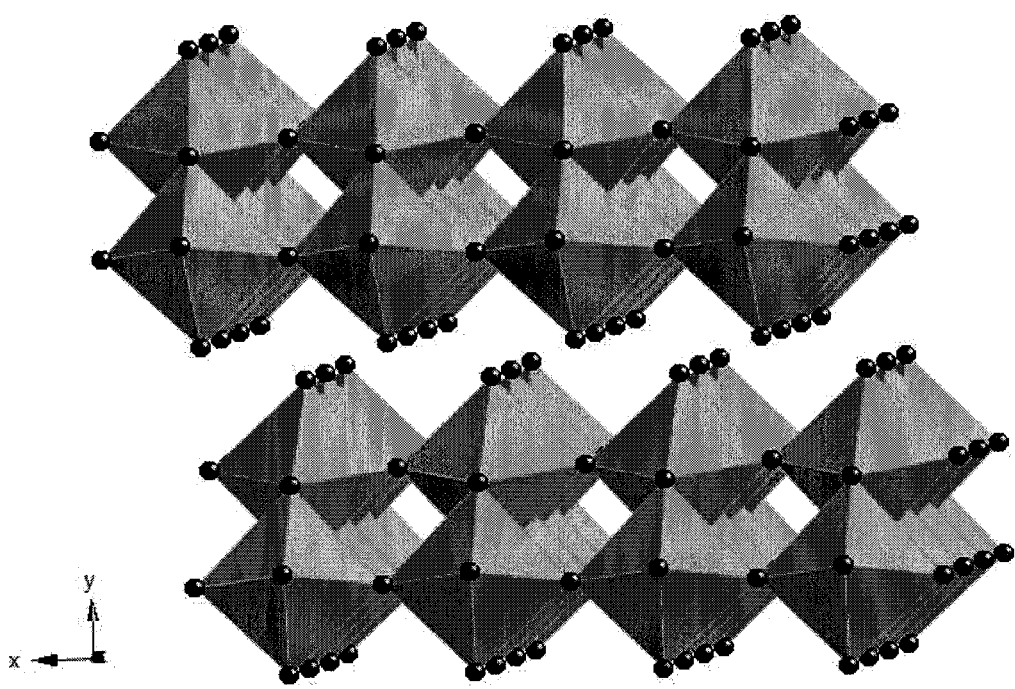
FIG. 2 shows the crystal structure of $MoO_3$. In the color code, oxygen atoms (O) are in black, and molybdenum (Mo) in grey.
Figure 3:
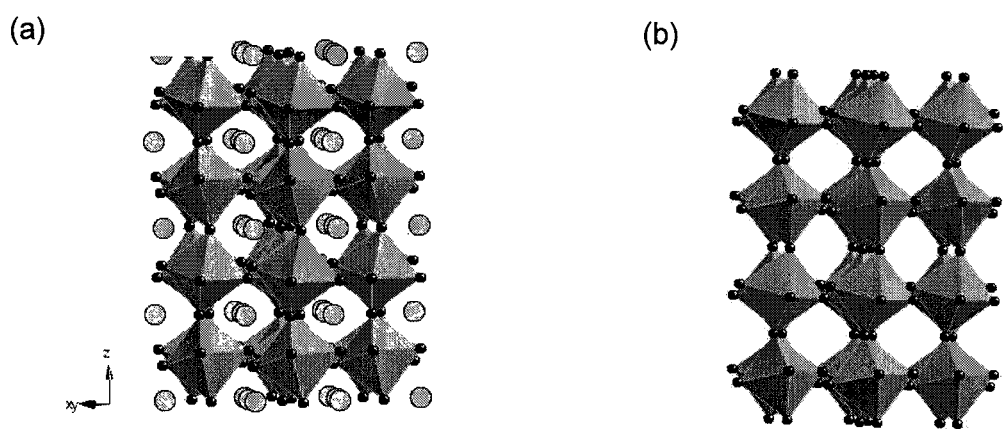
FIG. 3 shows (a) the crystal structure of perovskite $CaMoO_3$, with Ca in light grey, O in black, Mo in dark grey; and (b) the calculated structure of the virtual empty perovskite $MoO_3$ as optimized from Density Functional Theory (DFT) calculations.

The invention proposes molybdenum-based compounds suitable as positive electrode materials for use in a rechargeable multivalent battery. The multivalent element is the divalent $Ca^{2+}$. The operation principle of the battery involves reaction of the positive electrode materials with calcium ions (as shown in FIG. 1).

Generally the Ca-based battery, schematically described in FIG. 1 contains a positive electrode containing the positive electrode materials described in the present invention; a separator typically impregnated with a non-aqueous electrolyte or a gel polymer membrane containing calcium ions; and a negative electrode. Both positive and negative electrodes are commonly connected to current collectors. In the case of the anode, Ca can be used as both negative electrode material and current collector. All parts are fitted together in a battery casing which can have any shape. Commonly prismatic or cylindrical shapes will be preferred. The battery casing may be surrounded by some thermal components which could help the battery reach a certain working temperature.

Suitable positive electrode materials in the present invention include molybdenum in an oxidation state of 4 or more and 6 or less, like in $MoO_3$ ($Mo^{6+}$) or $CaMoO_3$ ($Mo^{4+}$) or $Mo_{17}O_{47}$, $Mo_8O_{23}$, $Mo_{18}O_{52}$.

Other suitable materials are compounds with formulae $Ca_yMo_zM_wO_xL_t$
where M is Cr, Co, Mn, Fe, Ni, Co
where y≥0; z≥1; w≥1; x≥1 where L is F, S, or N
where t≥0.

Here, Cr and Co are the preferred transition metal M since the ionic radii of $Co^{4+}$ and $Cr^{6+}$ are similar to the ionic radius of $Mo^{6+}$.

Mixtures of materials of formulae $Ca_yMo_zM_wO_xL_t$ and other materials such as alpha-$MoO_3$, beta-$MoO_3$, $CaMoO_3$, $Mo_{17}O_{47}$, $Mo_8O_{23}$, $Mo_{18}O_{52}$, $Mo_9O_{11}$, $Mo_9O_{24}$, for use as positive-electrode active materials also constitutes a preferred embodiment in the framework of the present invention.

The anticipated reactions occurring at the positive electrode for $Ca_yMo_zM_wO_xL_t$ materials are as follows:
During the cell discharge:

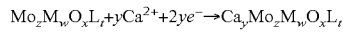

where the $Mo_zM_wO_x$ material is able to host $Ca^{2+}$.
During the cell charge:

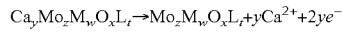

Suitable positive electrode materials in the present invention may have a two-dimensional crystal structure e.g. alpha-$MoO_3$; $Mo_zO_x$ layered materials with Mo in an average oxidation state between 5 and 6, including the reduced forms of $MoO_3$ where the oxygen lost is accommodated by the formation of crystallographic shear planes such as in $Mo_{17}O_{47}$, $Mo_8O_{23}$, $Mo_{18}O_{52}$.

Other suitable positive electrode materials may have a three-dimensional crystal structure, related to the $ReO_3$ and perovskite structural types (e.g. perovskite-$CaMoO_3$; beta-$MoO_3$; $Mo_9O_{11}$, $Mo_9O_{24}$) including molybdenum bronzes of generic formula $A_yMo_zM_wO_x$, where A is an alkaline earth metal, y≥0, w≥0, z≥1, x≥1 where M is W or V ($A_{0.33}MO_3$, $A_{0.9}Mo_6O_{17}$).

In the context of molybdenum-based compounds suitable as positive electrode materials in the present invention, metal impurity such as Mo metal in the materials up to 10% wt, preferentially up to 5 wt %, may be accepted.

It is considered that molybdenum-based compounds used in the present invention may generally be electrochemically active in presence of $Ca^{2+}$ which means that they change oxidation state while $Ca^{2+}$ is accommodated in their structure delivering current; and vice versa. These species may generally have a theoretical capacity above 180 mAh/g-active material, for example a theoretical capacity of at least 291 mAh/g for $CaMoO_3$ or of at least 372 mAh/g for $MoO_3$.

Figure 4:
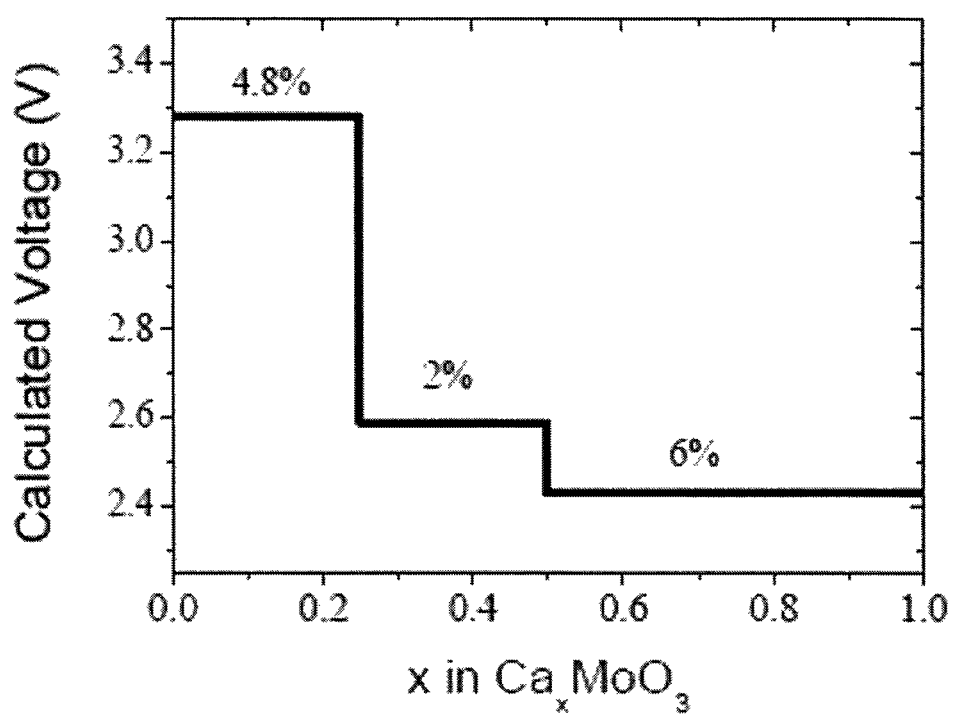
FIG. 4 shows the calculated voltage versus x in perovskite-$Ca_{1-x}MoO_3$ and associated calculated average volume variation determined by DFT calculations.

It is considered that such species may generally be used preferentially in combination with Ca metal anode (instead of $V_2O_5$ anode for example), the theoretical capacity of Ca metal being bigger than to the one of $V_2O_5$ and still giving an average theoretical battery operation voltage of approximately 2.7 V Please see FIG. 4 in this respect.

Figure 5:
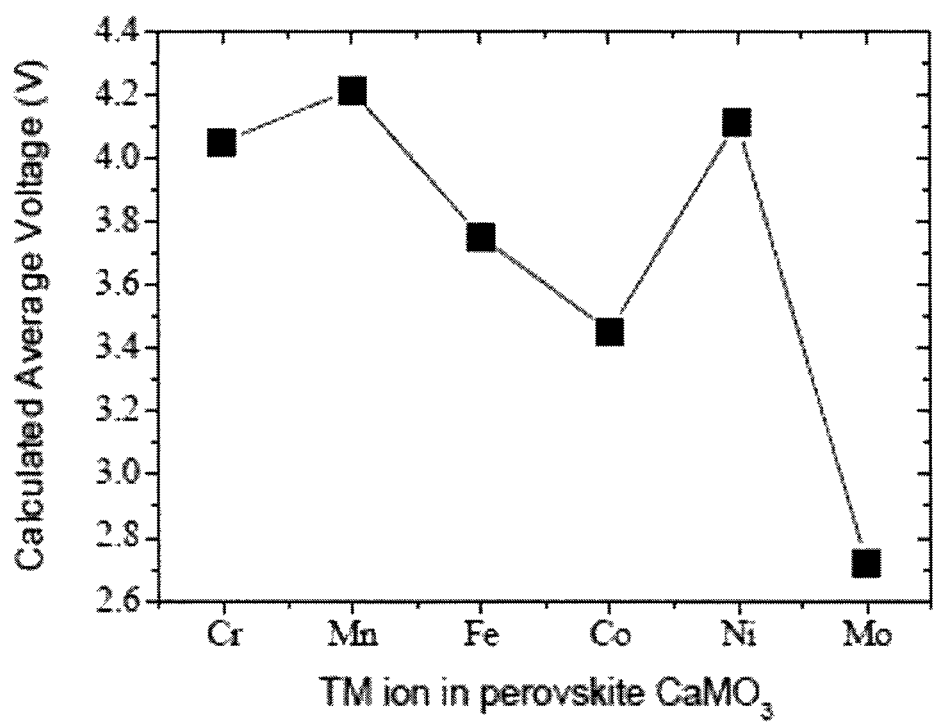
FIG. 5 shows the calculated average voltage for various transition metals (M) in the $CaMO_3$ perovskite structure.

Embodiments of the present invention may present one of more of the following advantages:
- the energy density of rechargeable calcium-based batteries of the present invention may be theoretically higher than that of the current commercial secondary Li-ion batteries, and higher than the calcium-based battery reported in previous art;
- the electrolyte may be stable in the presence of positive electrode materials described in the present invention even if the battery reaches temperatures above 40° C.;
- no environmentally unfriendly materials such as heavy metals (including mercury) are needed;
- compared to certain prior art calcium-based batteries, Ca batteries described in the present invention work at moderate temperatures (much lower than 580° C.);
- materials used in the present invention present moderate volume changes (less than 15%) between Intercalation and de-intercalation, a factor which supports the long term cyclability (cf. FIG. 2);
- materials of the present invention present good electronic conductivity;
- $Ca_yMo_zM_wO_xL_t$ materials of the present invention with w>0 may present higher operating voltage during cycling (FIG. 5).

In cells of the present invention, the negative electrode may be an electrode comprising or consisting of a negative-electrode active material, said active material including metallic calcium or a calcium alloy. In one advantageous embodiment, the alloy has formula (I) $Ca_mB$ wherein m is 0≤m≤3 and B is a metal or a semi-conductor element. Preferred negative electrodes include Ca metal, or Ca-alloys such as $Ca_xSn_y$, $Ca_xSi_y$ where preferentially 0≤x≤2; among these alloys, $CaSi_2$ is preferred.

The negative electrode may be for example a foil of metallic calcium. In this case, the metallic calcium may also play the role of current collector. A pre-formed, metallic calcium-containing negative electrode can thus be used during assembly of a calcium-based secondary electrochemical cell.

The negative electrode may include a support, such as a current collector, having a metallic calcium coating as negative-electrode active material. The coating is obtainable by depositing metallic calcium on the collector. The coating may be present on part of the support only or on the entire support.

The collector may be in the form of a foil, foam or grid. The collector may comprise or consist of copper, aluminum, stainless steel, nickel, gold, platinum, palladium, titanium or carbon. For example, the collector may comprise or consist of one or more of copper, aluminum, stainless steel, nickel, gold, platinum and palladium. Alternatively, the collector may include or consist of carbon for example type carbon paper. Copper, stainless steel, nickel and carbon, notably carbon and stainless steel, are cost-effective options. Use of gold or aluminum presents advantages in that these materials exhibit the lowest lattice mismatch with calcium. Carbon and aluminum present the advantage of being lighter.

Techniques are known to deposit metallic calcium on a support such as a collector. Electrochemical deposition is a possibility. In situ deposition of metallic calcium on a support previously added during cell assembly is a possibility. In situ deposition may take place while the cell is in use or in charge. Pulsed Laser Deposition or RF sputtering are other options. In this case, a target of pure calcium metal may be used. This target is commercially available for example from American Elements. Nickel foams or grids (on which metallic calcium may be deposited) are also commercially available from Goodfellow. Foams or grids made of copper or aluminum as well as carbon foams (one possible supplier of aluminum, copper or carbon foams is ERG-Materials & Aerospace Corporation) or carbon paper (one possible supplier of carbon paper is Toray), as foils or grids are also commercially available.

Use of a pre-formed, metallic calcium-containing negative electrode and metallic calcium deposition (e.g. in situ deposition) are not mutually exclusive options. If desired, metallic calcium deposition may be performed on a current collector already made of metallic calcium.

In a cell or battery according to the present invention, an electrolyte is arranged between the negative electrode and the positive electrode. In the electrolyte, calcium ions may be in the form of a calcium salt, for example and inorganic calcium salt and/or an organic calcium salt. Preferably, the salt is anhydrous. The salt may be selected from the group consisting of calcium tetrafluoroborate ($Ca(BF_4)_2$), calcium perchlorate ($Ca(ClO_4)_2$) calcium hexafluorophosphate ($Ca(PF_6)_2$), calcium tetrafluorosulfonylimide $Ca(TFSI)_2$, calcium triflate $Ca(Tf)_2$, $Ca(CF_3SO_3)_2$ and mixtures thereof. ($Ca(BF_4)_2$) and mixtures thereof may be preferred.

The salt may be dissolved in the electrolyte medium. The salt may be present in an amount comprised between 0.05M and 2M, such as between 0.1M and 1M, with respect to the volume of the electrolyte.

The electrolyte may be substantially free of other metal ions of Group I and II of the period table—for example lithium ions, sodium ions, potassium ions. This means that the amount of metal ions other than calcium possibly presents in the electrolyte is electrochemically ineffective.

Each solvent present in the medium is substantially free of water. Unless otherwise indicated, substantially free of water means that the solvent may include water in an amount equal to or lower than 300 ppm, such as equal to or lower than 50 ppm, as measured with the Karl Fischer titration technique.

Advantageously, each solvent present in the medium and/or the combination thereof is stable at a temperature between at least −30 and 150° C. (stability window).

Each solvent present in the medium may Independently be selected from the group consisting of cyclic carbonates, linear carbonates, cyclic esters, cyclic ethers, linear ethers and mixtures thereof.

Cyclic carbonates may be selected from the group consisting of ethylene carbonate (EC), propylene carbonate (PC), butylene carbonate, vinylene carbonate, fluoroethylenecarbonate (FEC) and mixtures thereof.

Linear carbonates may be selected from the group consisting of dimethyl carbonate (DMC), diethylcarbonate (DEC), ethyl methyl carbonate (EMC), and mixtures thereof.

Cyclic ester carbonates may be γ-buryrolactone and/or γ-valerolactone.

Cyclic ethers may be tetrahydrofuran (THF) and/or 2-methyltetrahydrofuran.

Linear ethers may be selected from the group consisting of dimethoxyethane (DME), ethylene glycol dimethyl ether, triethylene glycol dimethyl ether (TEDGE), tetraethyleneglycol dimethyl ether (TEDGE), and mixtures thereof.

In addition or in alternative, the solvent may include dimethylsulfoxide (DMSO) or nitrile solvents (such as propionitrile, and 3-methoxypropionitrile).

Preferably one of the at least two solvents is ethylene carbonate (EC). For example, the electrolyte medium may include ethylene carbonate (EC) and propylene carbonate (PC), such as a combination of formula $EC_h:PC_{1-h}$ wherein the ratio is expressed as volume:volume and h is $0 \leq h \leq 1$, such as $0.2 \leq h \leq 0.8$ or h is 0.5. Mixtures of ethylene carbonate (EC) and propylene carbonate (PC) may be stable between −90° C. and 240° C. The solvent may be for example a combination of ethylene carbonate (EC), propylene carbonate (PC) and dimethyl carbonate (DMC), such as a combination having formula $EC_x:PC_y:DMC_z$ wherein the ratio is expressed as volume:volume and $0 \leq x,y,z \leq 1$ and $x+y+z=1$.

The at least two solvents may be present in a total (i.e. combined) amount comprised between about 50 and 99% by mass, with respect to 100% by mass of the electrolyte. For example, the solvents may be present in an amount comprised between about 70 and 99% by mass, with respect to 100% by mass of the electrolyte. This range is preferred for having liquid electrolytes. When the electrolyte medium further includes a polymer—such as a gelling polymer—the solvents are advantageously present in an amount comprised between about 50 and 70% by mass, with respect to 100% by mass of the electrolyte. This range is preferred for having gel polymer electrolytes.

In preferred embodiments of the present invention, the electrolyte will contain $Ca(BF_4)_2$ in ethylene carbonate (EC): propylene carbonate (PC). Here a concentration of around 0.45M of $Ca(BF_4)_2$ will generally be appropriate. $Ca(Tf)_2$ or $Ca(PF_6)_2$ are also preferred.

The electrolyte medium may further include a component (such as a crown ether) that facilitates calcium salt dissociation and/or enhances calcium salts dissolution.

The electrolyte medium may further Include a gelling polymer. This is typically the case of gel polymer electrolytes.

The gelling polymer may be selected from the group consisting of polyethylene oxide (PEO), polyvinylidene fluoride (PVDF), polyacrylonitrile (PAN), polymethyl methacrylate (PMMA), poly(vinyl) chloride (PVC), and mixtures thereof.

When the electrolyte medium contains a gelling polymer as defined above, it may further comprise a filler, the filler including:

a component which can be cross linked and/or thermoset for example to improve the electrolyte mechanical properties, a plasticizer, for example to improve the electrolyte ionic conductivity, nanopartides/nanoceramics, and/or a component (such as a crown ether) that facilitates calcium salt dissociation and/or enhances calcium salt dissolution.

Nanopartides/nanoceramics may include $Al_2O_3$, $SiO_2$, $ZrO_2$, MgO, and/or $CeO_2$ and may have an average particle size equal to or lower than about 15 nm (this value can be measured by methods disclosed above). This component may be added to increase the electrolyte conductivity. Suitable $Al_2O_3$ nanoparticles having an average particle size of 5.8 nm are commercially available from Aldrich Research Grade. Suitable $SiO_2$ nanopartides having an average particle size of 7.0 nm are commercially available from Aldrich Research Grade.

The filler may be present in an amount of lower than 10% by weight with respect to the weight of the total gel polymer electrolyte.

As mentioned above, Ca—Si alloys may be used in negative electrode materials of the invention. Ca—Sn alloys are also candidates. The following tables show corresponding properties in terms of formula, molar mass and theoretical specific capacity:

TABLE 1

|  | Molar mass (g/mol) | Theoretical Specific capacity (mAh/g) |
|---|---|---|
| Si | 28.086 | 3818 |
| $Ca_3Si$ | 148.32 | 1084 |
| $Ca_2Si$ | 108.24 | 991 |
| $Ca_5Si_3$ (or $Ca_{5/3}Si$) | 314.65 | 852 |
| CaSi | 68.164 | 787 |
| $Ca_3Si_4$ (or $Ca_{3/4}Si$) | 232.58 | 692 |
| $CaSi_2$ (or $Ca_{0.5}Si$) | 96.250 | 557 |

TABLE 2

|  | Molar mass (g/mol) | Theoretical Specific capacity (mAh/g) |
|---|---|---|
| Sn | 118.71 | 903 |
| $Ca_3Sn$ | 238.94 | 673 |
| $Ca_2Sn$ | 198.71 | 540 |
| $Ca_5Sn_3$ (or $Ca_{5/3}Sn$) | 556.52 | 482 |
| $Ca_7Sn_6$ (or $Ca_{7/6}Sn$) | 992.81 | 378 |
| CaSn | 158.79 | 338 |

The negative electrode active material may contain one or more distinct alloys.

In the present invention, the negative electrode may be prepared as a powder composite negative electrode. This electrode is obtainable by processing, such as compressing, a mixture (a) including, such as consisting of:

component (a1) which is the negative electrode active material, for example a calcium alloy as defined above, and component (a2) which displays electronic conducting properties and/or electrode volume change constraining properties.

Obtaining mixture (a) may be performed by common techniques. For example, mixture (a) can be obtained by simply mixing the various components for example by means of planetary mills (such as ball miller commercially available from Fritsch).

Component (a1) may be used in an amount comprised between about 50% and about 100%, preferably between about 65% and about 95%, such as between about 70% and about 90%, for example about 75% with respect to the weight of mixture (a). Component (a2) may be used in an amount comprised between about 0% and about 40%, preferably between about 10% and about 30%, for example 25% with respect to the weight of mixture (a).

The properties of component (a2) are thought to be useful when the negative electrode is in use.

The negative electrode may be a composite film negative electrode. This electrode is obtainable by processing a slurry (b) including, such as consisting of:

component (b1) which is the negative electrode active material, for example a calcium alloy as defined above, component (b2) which displays electronic conducting properties and/or electrode volume change constraining properties, component (b3) which is a binder, component (b4) which is a solvent.

Component (b1) may be used in an amount comprised between about 50% and 90% by weight with respect to the combined weight of components (b1) to (b3), i.e. the solid content of slurry (b). When component (b1) contains silicon, for example a silicon-containing alloy of formula (I), it may be present in an amount of about 70% by weight with respect to the combined weight of components (b1) to (b3). When component (b1) contains tin, for example a tin-containing alloy of formula (I), it may be present in an amount of about 85% by weight with respect to the combined weight of components (b1) to (b3).

Component (b2) may be used in an amount comprised between about 5% and 30% by weight with respect to the combined weight of components (b1) to (b3). When component (b1) contains silicon, for example a silicon-containing alloy of formula (I), component (b2) may be present in an amount of about 22% by weight with respect to the combined weight of components (b1) to (b3). When component (b1) contains tin, for example a tin-containing alloy of formula (I), component (b2) may be present in an amount of about 7% by weight with respect to the combined weight of components (b1) to (b3).

Component (b3) may be used in an amount comprised between about 5% and 25% by weight with respect to the combined weight of components (b1) to (b3). When component (b1) contains silicon, for example a silicon-containing alloy of formula (I), component (b3) may be present in an amount of about 8% by weight with respect to the combined weight of components (b1) to (b3). When component (b1) contains tin, for example a tin-containing alloy of formula (I), component (b3) may be present in an amount of about 8% by weight with respect to the combined weight of components (b1) to (b3).

Component (b4) may be used in any amount suitable to impart a workable viscosity to the slurry. For example, it may be used in an amount of about 500% by weight with respect to the combined weight of components (b1) to (b3).

Slurry (b) may further comprise components commonly used in electrode manufacturing such as component (b5) suitable to impart self-standing properties to the negative electrode.

Components (a1) and (b1) may be in the form of particles having an average particle size falling in the range of 0.01 to 100 microns, such as in the range of 0.15 to 50 microns. Average particle size may be either communicated by particles supplier, or measured by e.g. SEM (scanning electron microscopy), TEM (transmission electron microscopy) or laser granulometry techniques.

In the context of slurry (b), component (b2) can typically facilitate slurry preparation and deposition. Components (a2) and (b2) may comprise, such as consist of particulate carbon. Particulate carbon may be selected within one or more of carbon black such as ketjen black, acetylene black, channel black, furnace black, lamp black, and thermal black; graphite, such as natural graphite, e.g., scaly graphite, artificial graphite, and expanded graphite; activated carbon from charcoal and coal; carbon fibers obtained by carbonizing synthetic fibers and petroleum pitch-based materials; carbon nanofibers; tubular carbon, such as carbon nanotubes; and graphene. A suitable conductive carbon black is Carbon Super P® commercially available from TIMCAL. The main characteristics of Super P® are their high purity, high structure and their moderate surface area. The high purity is evidenced by the low ash, moisture, sulfur and volatile contents, while their high structure is expressed by oil absorption and electrical conductivity. Super P® conductive carbon black is a carbon black with a high to very high void volume originating from the interstices between the carbon black particle due to its complex arrangement and porosity, in a particular structure. Such a structure allows retention of a conductive carbon network at low to very low carbon content in the electrode mix. Super P® is a material with no, or nearly no sieve residue on the 325 mesh sieve.

Component (b3) is typically used to ensure the cohesion of the negative electrode components. Component (b3) may comprise, such as consist of a thermoplastic and/or a thermosetting resin. Component (b3) may be selected from the group consisting of polyethylene, polypropylene, polytetrafluoroethylene (PTFE), polyvinylidene fluoride (PVDF), styrene-butadiene rubber (SBR), carboxymethylcellulose (CMC) or salts thereof showing various molecular weights and mixtures thereof. For example, component (b3) may be a combination of CMC and SBR.

Component (b3) may also be selected from the group consisting of tetrafluoroethylene-hexafluoropropylene copolymers, tetrafluoroethylenehexafluoropropylene copolymers (FEP), tetrafluoroethylene-perfluoroalkyl vinyl ether copolymers (PFA), vinylidene fluoride-hexafluoropropylene copolymers, vinylidene, fluoride-chlorotrifluoroethylene copolymers, ethylenetetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, and mixtures thereof.

Component (b3) may also include a copolymer having sulfonate group-terminated perfluorovinyl ether groups attached to a poly(tetrafluoroethylene) backbone. An example is copolymers commercially available under the name Nafion®. For example, the copolymer may be a dispersion of a copolymer having sulfonate group-terminated perfluorovinyl ether groups attached to a poly(tetrafluoroethylene) backbone in a mixture of water and 20% by weight of alcohol. This product is commercially available under trademark LIQUION™ from Ion Power Inc.

Component (b4) is typically used to impart a viscous aspect to slurry (b). Component (b4) may be a solvent selected from the group consisting of acetone, alcohols such as ethanol, cyclic aliphatic hydrocarbon compounds such as cyclohexane, N-methyl-2-pyrrolidone (NMP), propylene carbonate (PC), N,N-dimethylformamide, tetrahydrofuran (THF), water and mixtures thereof.

An example of component (b5) is a plasticizer such as any one or more of poly ethylene glycol (PEG) and dibutylphtalate (DBP).

Obtaining slurry (b) may be performed by common techniques. For example slurry (b) can be obtained by dispersing solid components (e.g. components (b1) to (b3)) in component (b4) for example by means of a high-performance disperser (such as dispersers available from IKA) or an ultrasonic disperser (such as dispersers available from Hielscher) or/and by means of a centrifugal mixer (such as commercially available from Thinky). WO 2013/139370 discloses for example a method for manufacturing a slurry by suspending particulate carbon, a binder and optionally a catalyst in a solvent.

A composite film negative electrode as defined above (whether self-standing or supported) may be manufactured by a method comprising a step i) of depositing the negative electrode active material, e.g. in the form of a slurry (b), on a support.

Depositing may be casting or impregnating, as appropriate depending e.g. on the desired structure of the electrode (self-standing or supported on a current collector and, in this latter case, the type of current collectors used).

Casting may be performed by the Doctor Blade method, which allows a fine control of the thickness of the active material deposited layer. For casting, the support may be in the form of a foil. For casting, the support may be made of e.g. copper, aluminum, stainless steel, nickel, gold, platinum, palladium, titanium or carbon if it is a current collector or e.g. glass or Teflon for self-standing electrodes.

Impregnating may be performed as disclosed in WO 2013/139370 (PCT publication page 16, line 19 onwards) wherein a carbon foam support is impregnated with a slurry containing particulate carbon, a binder, a solvent and optionally a catalyst for the manufacture of a negative electrode active material for lithium-air batteries. Typically, impregnating is chosen when the support is a current collector in the form of a foam.

When the negative electrode is designed to be a self-standing one, such as a self-standing film negative electrode, the method may further comprise a step ii-1) of drying the active material deposited on the support and a subsequent step iii-1) of removing, for example peeling off, the support.

Alternatively, the method may further comprise a step ii-2) of drying the active material, deposited on the support and a subsequent step iii-2) of further processing the product obtained in step 11-2). This embodiment of the method is suitable to obtain negative electrodes in which the support is a current collector as defined above and hence it is part of the final negative electrode. Further processing in step iii-2) may include a step of heat treating the product of step ii-2). Typically, heat treating is performed at a temperature lower than the melting temperature of the alloy(s) contained in the active material.

Further processing in step iii-2) may include a step of cutting and/or pressing the optionally heat-treated product of step ii-2). Typically, pressing is performed under a pressure between $10^7$ to $10^9$ Pa. Cutting and pressing may be performed in any order.

In the present invention, the positive-electrode active material containing a molybdenum oxide-based material may also be formulated as a part or the whole of a powder composite positive electrode, using processing techniques as described above for the negative electrode. When preparing a powder electrode mixture for the present Invention, Mo-based materials may be prepared to which an electronic conductor (such as carbon, or metal particles) is added. Similarly, the positive-electrode active material containing a molybdenum oxide-based material may also be formulated as a part or the whole of a composite film positive electrode, using processing techniques as described above for the negative electrode. Thus, a slurry may be prepared containing one or more of the above-described Mo-based materials, an electronic conductor (such as carbon, or metal particles) and/or a binder (such as PVDF, PTFE, CMC, Nafion). The resulting slurry may be coated on a current collector in the form of a foil (Al foil) or in the form of foam (such as Al foam, carbon foam) or in form of a porous membrane (such as carbon paper).

In a calcium-based secondary cell according to the invention, in the dry weight of the powder mixture or slurry composition used to form a positive-electrode active layer/coat a conducting electrode surface (such as a metal foil), the positive-electrode active material which is a molybdenum oxide-based material containing molybdenum in an oxidation state of 4 or more and 6 or less, may appropriately constitute at least 50% by weight, such as at least 60%, at least 70%, at least 80%, or at least 90% by weight of the total dry weight of the powder mixture or slurry composition, the remainder typically comprising, notably, conductive components such as carbon-based materials and binders such as polymer binders.

Advantageously, the cell of the present Invention may further comprise a temperature control element. For example the temperature control element may not be physically part of (e.g. an integral part of) the cell but they may be configured to interact. The temperature control element may be configured to provide heating functionality and/or cooling functionality, e.g. depending on whether the cell is used in a context—such as a fuel engine—wherein a heat source is already present. An element configured to provide at least cooling functionality may be advantageous when considering the unavoidable self-heating of the cell when in use due to the Joule effect. Alternatively, the temperature control element may be configured to provide instructions to heating and/or cooling elements present with the cell. Background Information on possible technical solutions to pre-heat high-voltage battery packs in hybrid electric vehicles up to room temperature (i.e. 25 degrees) can be found for example in A. Pesaran et al. "Cooling and Preheating of Batteries in Hybrid Electric Vehicles", The $6^{th}$ ASME-JSME Thermal Engineering Joint Conference, Mar. 16-20, 2003, TED-AJ03-633.

The temperature control element is configured to bring and/or maintain the cell at a temperature between about 30° C. and 150° C., such as between about 50° C. and 110° C., which was found to be particularly effective for operating the cell presently disclosed. More preferred temperature ranges of operation are between 60° C. and 80° C., more preferably between 70° C. and 80° C., and most preferably around 75° C. Although it is not intended to be bound by any theory, it is believed that at this temperature an appropriate conductivity of the SEI (solid-electrolyte Interphase) can be achieved and/or an improved ion-pairing would occur, in any of the above mentioned cases improving the battery performances. Accordingly, if the cell is operated in an environment characterized by low temperatures (such as a device or a vehicle exposed to winter temperatures), the temperature control element is suitably provided and/or coupled with heating means (for example pre-heating means), such as a resistance heater and/or a heat pump, so as to bring the cell to desired operating temperature. The temperature control element may also be provided with cooling means, for example a fan configured to blow forced air and/or a refrigeration unit configured to operate a refrigeration cycle, so as to maintain the cell within a suitable window of operating temperatures in case the device of the vehicle Is provided with a heat source such as a fuel engine or the cell, power inverter, or other devices nearby generate heat.

According to some embodiments, the temperature control element may include cooling means only for those applications intended to be consistently exposed to temperatures above about 30° C. The temperature control element may be an integral cell thermal management device Including both a heating and a cooling means. The device may be operated in a controlled manner by e.g. a computer-assisted device (also possibly part of the temperature control element) so as to reach and maintain an appropriate operating temperature depending on the ambient conditions.

The cell may further comprise a separator. The separator may be a porous film or a non-woven fabric. For example, the separator may comprise polyethylene, polypropylene, cellulose, polyvinylidene fluoride and glass ceramics or mixtures thereof. The separator may contain the electrolyte. A secondary cell incorporating this embodiment may be obtainable by contacting, e.g. impregnating, the separator with a liquid electrolyte.

The secondary cell may have any form, such as prismatic or cylindrical form.

In one aspect, the present disclosure discloses a non-aqueous calcium-based secondary battery comprising a calcium-based secondary cell as defined above, for example a plurality of calcium-based secondary cells wherein at least one is a calcium-based secondary cell as defined above or a plurality of calcium-based secondary cells each independently being as defined above. The battery may include one or more secondary cells as defined above, and a casing. The casing may be surrounded by a temperature control element as defined above, in case this element is present.

In one aspect, the present disclosure discloses a vehicle, such as a motor vehicle, comprising a non-aqueous calcium-based secondary battery as defined above.

In one aspect, the present disclosure discloses an electronic device, such as an information-related device or a communication device (for example a personal computer, camcorder or cellular phone), comprising a non-aqueous calcium-based secondary battery as defined above.

In one aspect, the present disclosure discloses a stationary power generating device comprising a non-aqueous calcium-based secondary battery as defined above.

Within the practice of the present invention, it may be envisaged to combine any features or embodiments which have hereinabove been separately set out and Indicated to be advantageous, preferable, appropriate or otherwise generally applicable in the practice of the invention. The present description should be considered to include all such combinations of features or embodiments described herein unless such combinations are said herein to be mutually exclusive or are dearly understood in context to be mutually exclusive.

Unless otherwise stated, the potentials (in Volt) In the present description and drawings are given versus $Ca^{2+}/Ca$.

Potentials are measured by a potentiostat versus a Quasi Reference Electrode. Typically ferrocene or similar internal standard such as cobaltocene is used. Use of ferrocene is known to be suitable for works in non-aqueous media.

EXAMPLES

The following experimental examples are illustrative and enable the functioning of the invention to be understood. The scope of the invention is not limited to the specific embodiments described hereinafter.

Example 1: $MoO_3$/Ca Using Coated Positive Electrode $MoO_3$ Material

A commercial $MoO_3$ material (Molybdenum(VI) oxide, 99.5%, Alfa Aesar A11159) was used.

Figure 6:
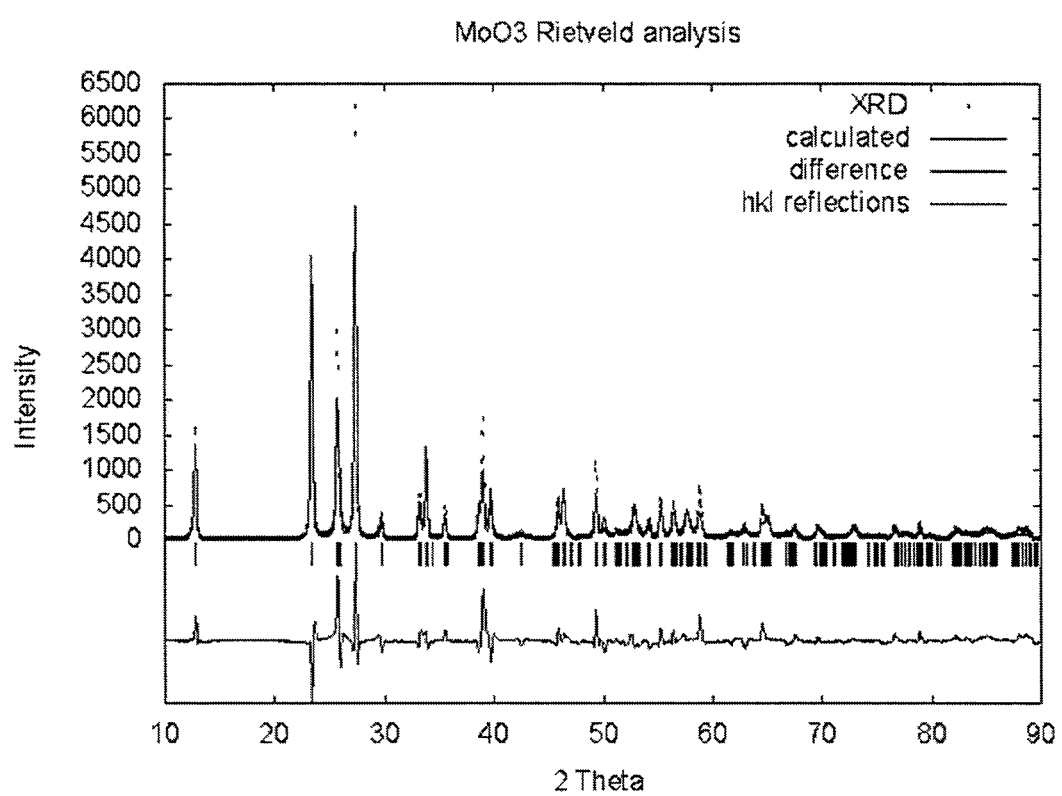
FIG. 6 shows the Rietveld analysis of commercial lamellar $MoO_3$.

FIG. 6 represents the X-Ray Diffraction and Rietveld analysis on the $MoO_3$ sample. This material presents a lamellar structure.

Electrode Preparation

Disk electrodes were produced by coating slurry on aluminum foil. The slurry is prepared by mixing active material, Csp and PVDF in a weight ratio of 80/10/10 (2 g $MoO_3$ mixed with 0.25 g carbon black (super P) and 2 g of 10% solution of PVDF in NMP). To achieve the right viscosity, NMP is added as long as the slurry exhibits a flow. At first mixing is done with a spatula in a beaker, the final one is done in a Tinky Mixer at 600 rpm for 5 minutes.

A 15 cm×30 cm piece of aluminum foil was placed on an Erichson Coater and spread flat. The slurry was spread along an approximately 10 cm line at the end of the foil and coated with a 350 μm gap along the sheet. The drying took place in a vacuum oven at 80° C.

Battery Assembly

Three electrode Swagelok cells were used for the electrochemical tests.

Self-made calcium discs are used both as reference and counter electrode. Therefore, calcium grains (Sigma, 99%), were pressed to a pellet of 13 mm in diameter and app. 1 mm height using a die and a hydraulic press. This process is done in air. Within a glovebox ($H_2O<0.5$ ppm, $O_2<5$ ppm) the passivation layer is removed by scratching using a spatula.

The active material electrodes are cut to 16 mm discs, dried and weighed, to determine the active material load.

Aluminum current collectors are used for the positive electrode, stainless steel for the counter and reference electrodes. Before assembly, each collector is polished with sand paper, The cells are assembled inside the glovebox. 150 μl of electrolyte are placed inside the compartment of anode (calcium) and cathode ($CaMoO_3$) before pressing them together. Subsequently additional 150 μl are added before adding the reference electrode. Separation is achieved by a glass fiber disc.

Battery Testing

Said electrodes (typical loading ca. 16 mg of active material) were used for galvanostatic cycling with potential limitation (GCPL) and potentiostatic intermittent titration technique (PITT) tests at 75° C. and 50° C. 10 h were used to let the OCV stabilize after placing the cell into the temperature chamber. GCPL was performed at a C/100 rate and PITT measurements with potential steps of 5 mV, the potential being stepped to the next value when the current dropped below a value corresponding to a rate of C/200.

Figure 8:
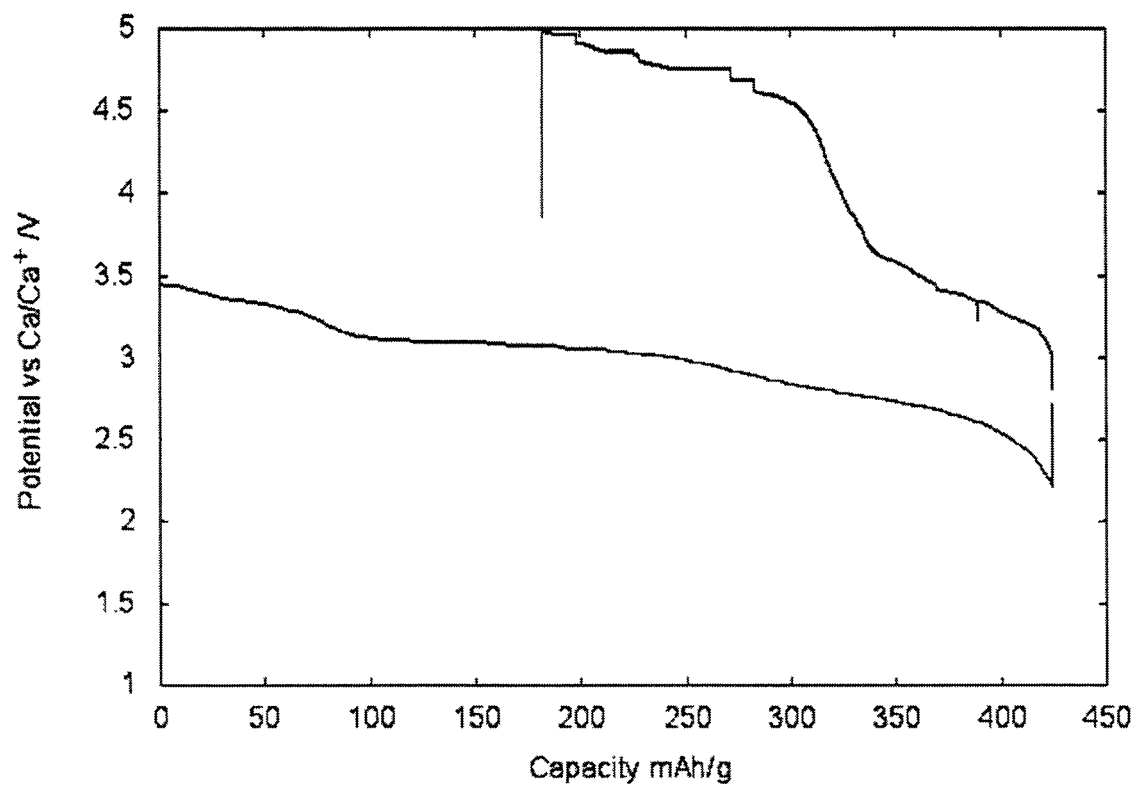
FIG. 8: shows potentiostatic intermittent titration technique (PITT) discharge and charge profiles of $MoO_3$ coated electrodes cycled at 75° C. versus $Ca^{2+}/Ca$.

FIG. 8 represents the first discharge and charge of $MoO_3$ coated electrode. The test was performed at 75° C. using a Ca counter electrode in 0.45 M $Ca(BF_4)_2$ in EC:PC electrolyte.

Figure 9:
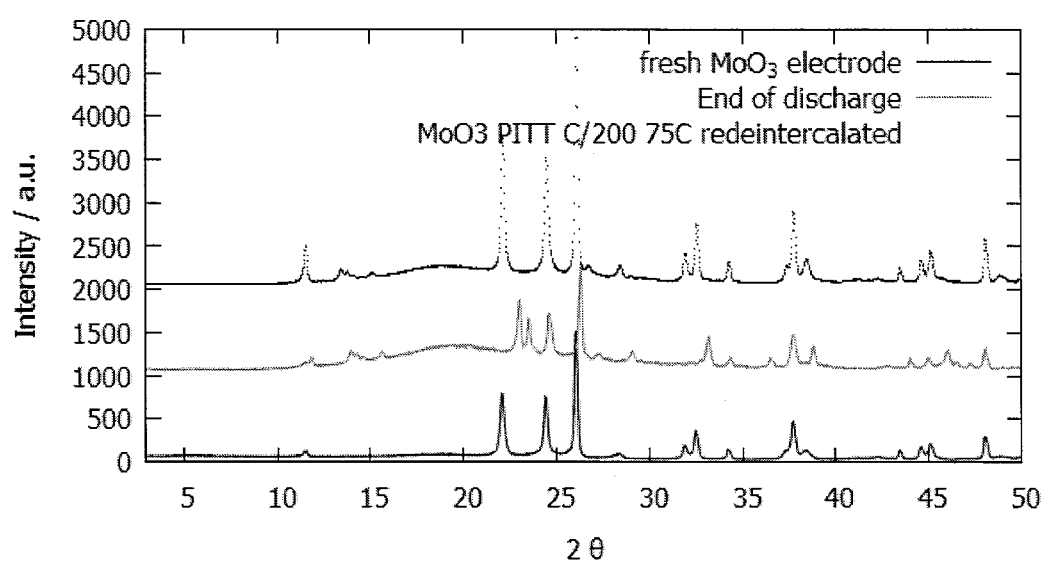
FIG. 9 shows XRD analysis on electrodes containing $MoO_3$ as prepared, after discharged at 75° C. and after recharge at 75° C.

FIG. 9 represents the X-Ray diffractions of the initial $MoO_3$ based electrode, of the same electrode after discharge, and of the same electrode after recharge. A clear change of structure is observed during discharge. It is also obvious that the structure returns to its initial state after charge confirming that the structure accommodate reversibility the ions.

Example 2: $CaMoO_3$/Ca Using Coated Positive Electrode

Synthesis of $CaMoO_3$ Positive Material

The precursor $CaMoO_4$ can be prepared by a citrate technique but is also commercially available. Therefore, a description of the $CaMoO_4$ synthesis is given and subsequently the reduction to $CaMoO_3$.

At first a 10% citric add solution (10 mL) was prepared. xmmol $CaCO_3$ (0.3 g) and ½×mmol $(NH_4)_6Mo_7O_{24}·4H_2O$ (0.528 g) were weighed precisely and added together to the solution. 20 minutes of stirring in a glass vial at room temperature were followed by an increase in temperature to 80° C. When most of the water was evaporated a blue gel appeared and the temperature was increased to 100° C. and then 120° C. until a blue powder remained. The powder was ground and put it into an aluminum crucible.

To reduce the $CaMoO_4$ precursor obtained by the citrate technique to $CaMoO_3$ three furnace heating steps were applied. With 200° C./h the tube oven was ramped up to 600° C. and kept at this temperature for 12 hours. Afterwards a two hour heating step at 800° C. was performed. When cooled down to room temperature, the powder, now white, was ground. These temperature steps led to mostly amorphous $CaMoO_4$ powder.

The reduction to $CaMoO_3$ is the same for both self-made and bought $CaMoO_4$ powder (supplier Alfa Aesar 99.8%).

The reduction from $Mo^{6+}$ to $Mo^{4+}$ took place in a tube furnace from Novotherm. One outlet was connected to the gas line, the other one was equipped with an overpressure outlet valve. An $Ar/H_2$-4% mixture supplied by Praxair was used as reducing gas. Approximately 5 g of $CaMoO_4$ were filled into a 10 ml aluminum oxide combustion boat and placed inside the middle of the furnace's tube. The temperature was ramped up with 300° C./h to 1200° C. under air and kept for 4 hours. When the set point temperature was reached, the reducing gas flow was turned on by first purging and then reducing the flow to 60 l/h at 1.6 bar. To prevent further reduction during the cooling period, after 4 hours the tube is purged by argon and a small flow of 60 l/h was remained until a temperature of 400° C. was reached.

Finding the precise time to finish the synthesis was difficult because molybdenum was also found to appear in the batch which resulted from over reduction of the precursor. In a previous synthesis route, the reduction took place at 900° C. for 12 hours. The result exhibited approximately 10% molybdenum content. This phenomenon was also observed by Im et al. (Ceramics International 38 (2012) 153-158) but could be reduced by changing the reduction thermodynamic conditions by elevating the temperature from initial 900° C. to 1200° C. and reducing the $H_2$ content from 8% to 2% and limiting the reaction time to 10 hours. As it was not possible to change the reducing gas with 4% $H_2$ content, the reaction time was reduced to 4 hours which did not lead to a pure phase but reduced the molybdenum content to a few percent.

Figure 7:
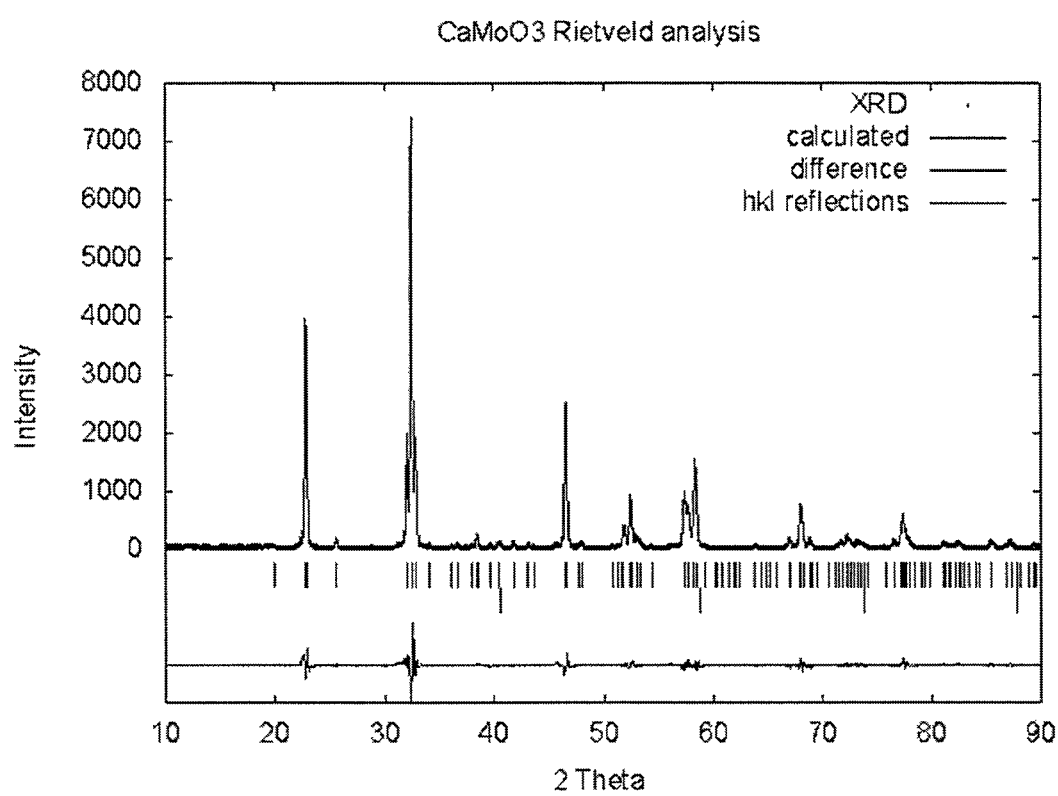
FIG. 7 shows XRD and Rietveld analysis of $CaMoO_3$ (prepared by $Ar/H_2$ treatment of commercial $CaMoO_4$).

As $CaMoO_4$ is white and $CaMoO_3$ brown/black the success of the synthesis can be already judged qualitatively by visual Inspection. As the powder forms to a briquette, the bottom side can be observed, where often some grey powder remains as well as at the edges. However, this was be removed with a spatula. The XRD pattern with Rietveld fit is shown is FIG. 7. The small peak at 40.58° is indicating a molybdenum phase.

Electrode Preparation

The same procedure as the one in example 1 was used.

Battery Assembly:

The same procedure as the one in example 1 was used.

Battery Testing

Figure 10:
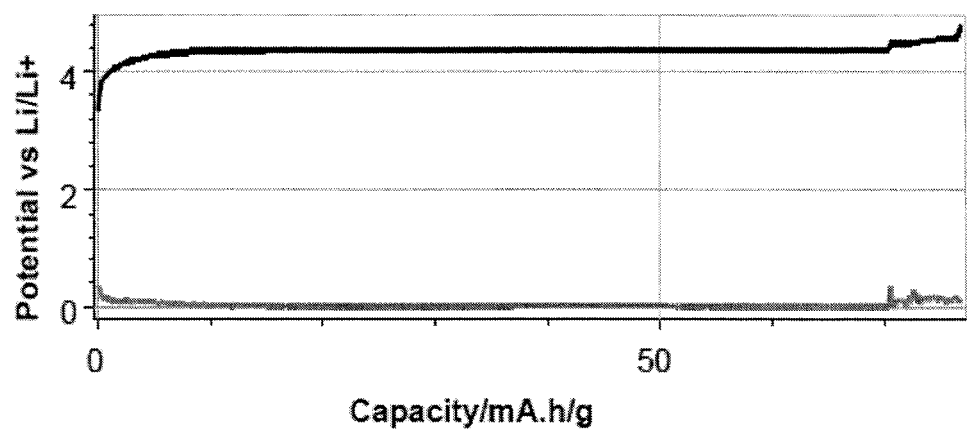
FIG. 10 shows a charge curve of a $CaMoO_3$ coated electrode by PITT by applying a 5 mV step and a cut off current of C/200 at 75° C.

Said electrodes (typical loading ca. 12 mg of active material) were used for galvanostatic cycling with potential limitation (GCPL) and potentiostatic intermittent titration technique (PITT) tests at 75° C. and 50° C. 10 h were used to let the OCV stabilize after placing the cell into the temperature chamber. GCPL was performed at a C/100 rate and PITT measurements with potential steps of 5 mV, the potential being stepped to the next value when the current dropped below a value corresponding to a rate of C/200. (FIG. 10)

Example 3: $CaMoO_3$/Ca Using Powder Positive Electrode

Powder type electrodes were prepared by simple mixing the $CaMoO_3$ with Csp in a weight ratio of 70/30, in an agate mortar for 15 min. Said electrodes (typical loading ca. 7±1 mg) were used for galvanostatic cycling with potential limitation (GCPL) and potentiostatic intermittent titration technique (PITT) tests at 100° C. GCPL was performed at a C/100 rate and PITT measurements with potential steps of 10 mV, the potential being stepped to the next value when the current dropped below a value corresponding to a rate of C/200 for $CaMoO_3$. Three electrode Swagelok type cells were used with calcium metal (Alfa Aesar, 98%) as counter electrode and a disk of Li metal foil as reference electrode. Two sheets of Whattman GF/d borosilicate glass fiber were used as a separator, soaked with the electrolyte (ca. 0.5 cm³ of 0.45M $Ca(BF_4)_2$ in EC:PC).

Example 4: $MoO_3$/Ca Using Powder Positive Electrode

Powder type electrodes were prepared by simple mixing the $MoO_3$ with Csp in a weight ratio of 70/30, in an agate mortar for 15 min. Said electrodes (typical loading ca. 7±1 mg) were used for galvanostatic cycling with potential limitation (GCPL) and potentiostatic intermittent titration technique (PITT) tests at 100° C. GCPL was performed at a C/100 rate and PITT measurements with potential steps of 10 mV, the potential being stepped to the next value when the current dropped below a value corresponding to a rate of C/200 for $MoO_3$. Three electrode Swagelok type cells were used with calcium metal (Alfa Aesar, 98%) as counter electrode and a disk of Li metal foil as reference electrode. Two sheets of Whattman GF/d borosilicate glass fiber were used as a separator, soaked with the electrolyte (ca. 0.5 cm³ of 0.45M $Ca(BF_4)_2$ in EC:PC).

Comparison with Prior Art Materials

The following table summarizes properties of the rechargeable batteries described in the present invention as compared to ones disclosed in the following prior art references discussed above:

Prior art 1: JP 2012-248470
Prior art 2: Ph.D. thesis of John Rogosic
Prior art 3: Hayashi et al., *Electrochemical and Solid-state Letters*, 7(5), A119-A121 (2004)
Prior art 4: Hayashi et al., *Journal of Power Sources* 119-121 (2003), 617-620
Prior art 5: US 2003/0059684

TABLE 3

| Type of battery | Positive material | Molar weight of positive material (mol/g) | Negative material | Theoretical capacity of positive material (mAh/g-positive material) | Experimental capacity of positive material (mAh/g-positive material) | Experimental operation voltage (V) |
|---|---|---|---|---|---|---|
| Battery type 1 of present invention | $CaMoO_3$ | 183.91 | Ca | 291 | 80 | NA |
| Battery type 2 of present invention | $MoO_3$ | 143.91 | Ca | 372 | 410 | 3.5 |
| Battery type 3 of present invention | $MoO_3$ | 143.91 | $CaSi_2$ | 372 | 410 | NA |
| Prior art 1(*) | $Ca_3Co_2O_6$ | 327.86 | $V_2O_5$ | NA | 180 | 3.2 (example 2) or 2.7 (example 3) |
| Prior art 2 | Chevrel phases $Ca_2Mo_6Se_8$, $Mo_3Se_4$ | 1287.32 600.84 | $CaHg_{11}$—CaHg | NA | 8 | 1.40 V (FIG. 40) |
| Prior art 3(**) | $V_2O_5$ | 182 | Ca | NA | 450 | −1 V (vs $Ag^+$/Ag reference electrode) |

TABLE 3-continued

| Type of battery | Positive material | Molar weight of positive material (mol/g) | Negative material | Theoretical capacity of positive material (mAh/g-positive material) | Experimental capacity of positive material (mAh/g-positive material) | Experimental operation voltage (V) |
|---|---|---|---|---|---|---|
| Prior art 4(**) | $V_2O_5$—$P_2O_5$ | 323.94 | Ca | NA | 500 | −0.75 V vs $Ag^+$/Ag reference electrode |
| Prior art 5 | $Fe_2(SO_4)_3$ | 399 | Ca | NA | NA | NA |

NA = not applicable (in some cases, this measurement not provided)

(*)Values given not arising from graphical data (**)Operation voltage of the battery is not given, not allowing direct comparison. Here reported is voltage given in the prior art document vs. reference Ag+/Ag (operation voltage in prior art expected to be 2.67 V vs. $Ca^{2+}$/Ca)

The invention claimed is:

1. A calcium-based secondary cell comprising:
    a negative electrode that includes a negative-electrode active material, said negative-electrode active material being capable of accepting and releasing calcium ions,
    a positive electrode that includes a positive-electrode active material, said positive-electrode active material being capable of accepting and releasing calcium ions,
    an electrolyte arranged between the negative electrode and the positive electrode,
    wherein the positive-electrode active material is a molybdenum oxide-based material containing molybdenum oxide-based material selected from the group consisting of alpha-$MoO_3$, beta-$MoO_3$, $CaMoO_3$, $Mo_{17}O_{47}$, $Mo_{18}O_{52}$, $Mo_9O_{11}$, and $Mo_9O_{24}$.

2. The cell according to claim 1, wherein the negative electrode material is a calcium metal anode.

3. The cell according to claim 1, wherein the negative electrode material is a Ca—Si or Ca—Sn alloy.

4. The cell according to claim 1, wherein the electrolyte contains $Ca(BF_4)_2$, calcium triflate or $Ca(PF_6)_2$.

5. The cell according to claim 1, wherein the electrolyte contains a mixture of ethylene carbonate (EC) and propylene carbonate (PC).

6. The cell according to claim 1, wherein the cell further comprises a temperature control element.

7. A non-aqueous calcium-based secondary battery comprising a calcium-based secondary cell according to claim 1.

8. A vehicle, an electronic device or a stationary power generating device comprising a non-aqueous calcium-based secondary battery according to claim 7.

* * * * *